United States Patent

[11] 3,587,654

| [72] | Inventor | William C. Yocum<br>Mount Lebanon Township, Allegheny County, Pa. |
|---|---|---|
| [21] | Appl. No. | 774,829 |
| [22] | Filed | Nov. 12, 1968 |
| [45] | Patented | June 28, 1971 |
| [73] | Assignee | Superior Valve Company<br>Washington, Pa. |

[54] QUICK-REMOVABLE SEAL CAPS FOR FITTINGS AND THE LIKE
8 Claims, 5 Drawing Figs.

[52] U.S. Cl. ................................................ 138/96,
138/89, 220/24.5
[51] Int. Cl. .................................................... B65d 59/06
[50] Field of Search .......................................... 138/96, 96
(T), 89; 220/24.5, 24 (A)

[56] References Cited
UNITED STATES PATENTS
1,247,756  11/1917  Wadsworth .................. 138/96

| 2,213,430 | 9/1940 | Irwin et al. | 138/96 |
| 2,551,834 | 5/1951 | Ferguson | 138/96 |
| 2,708,950 | 5/1955 | Averett | 138/96 |
| 2,942,625 | 6/1960 | Costanzo | 138/96 |
| 3,104,681 | 9/1963 | Gray, Jr. | 138/96 |
| 3,327,379 | 6/1967 | Clements | 139/96X |

*Primary Examiner*—James Kee Chi
*Attorney*—Buell, Blenko & Ziesenheim

ABSTRACT: The application discloses quick removal of caps which are conventionally used on various types of fittings or plumbing components to seal them and prevent entry of foreign matter. A string, wire, cord, or other flexible member is placed between the seal cap and the fitting to facilitate removal and/or cutting of the seal cap. When the cord is pulled to cut or remove the seal cap the tightly fitting cap at least aids in preventing the cord from being pulled from its position between the cap and fitting.

PATENTED JUN28 1971 3,587,654

INVENTOR
William C. Yocum.
BY
Buell, Blenko & Ziesenheim
HIS ATTORNEYS

QUICK-REMOVABLE SEAL CAPS FOR FITTINGS AND THE LIKE

My present invention relates to quick-removal seal caps for various types of fittings and plumbing components, and more particularly to a seal cap and fitting provided with a pull string or the like for quickly removing the seal cap.

There are a large variety of fittings and components provided with fittings used in various plumbing installations. When such fittings are fabricated from brass or copper, it is frequently desirable to provide the fittings with end caps to protect the external thread or flared surfaces used to secure the fittings in various modes to a typical plumbing installation. The relative softness of copper and brass render such threads and flared surfaces susceptible to damage in handling. End caps of various types are frequently used to prevent such damage.

The desirability of protecting fittings having male threads is obvious. Similarly, marring the chamfered portions of a compression type fitting makes it virtually impossible to obtain a proper seal with the complementarily flared copper tubing or other compression joint component.

In addition there are many components for various types of plumbing installations having such fittings detachably or permanently secured thereto. The use of sealing caps are desirable for excluding foreign material from such components as valves and gages of various types, until they can be coupled to the plumbing installation. Another example of such components includes drier units used in refrigeration systems and in other forms of plumbing installation. It is necessary to seal the inlet and outlet ports, i.e. the fittings secured to the drier units, to prevent the entry of air and the partial or complete absorption of moisture therefrom by the desiccant material. Where it is desirable to exclude such foreign matter, seal caps are employed regardless of the type of fitting connection. Thus, the seal caps are used on "sweat" or solderable fittings which do not usually require protection under ordinary handling or shipping conditions.

Many types of seal caps are currently in use. These are usually fabricated from plastic of varying degrees of resiliency. The softer plastic materials are molded or heat-formed directly upon those portions of the fittings or other components for which protection is desired. In those applications requiring greater protection the seal caps are preformed from tougher plastic which is dilated or originally in enlarged form and is then shrunk upon the fitting or the like to form an effective seal against moisture and other foreign matter.

Conventional seal or protective caps of the character described can be removed only with considerable time and difficulty. Usually, seal caps must be removed by cutting with a knife. Beyond the inconvenience and the possibility of personal injury, the use of a knife is likely to damage male threads or the face of the sealing chamfer, as the case may be, to thwart one of the purposes in using seal caps. If the threads or the chamfers are damaged, when cutting off the seal caps, it is virtually impossible to seal the mating surfaces of the fittings or joint.

I overcome these disadvantages of the prior art by wrapping a length of a flexible member or cord, such as string or wire about the fitting area which will be covered by the seal cap. When the fitting includes both a male thread and a chamfered sealing face, the pull cord can be wrapped about the area between the thread and the flared or chamfered face. The cord is held securely in place when the seal cap is placed on the fitting. The seal cap is closely fitted, by known practice, upon the fitting so that the string is tightly held in place on the fitting in addition to providing a proper seal. For example, this is accomplished by dilating and shrinking certain preformed seal caps, as noted previously. In other arrangements with the cord held in place a seal member can be molded or pressed by conventional techniques to form the cap directly upon the portion of the fitting requiring protection. It is contemplated in other arrangements of my invention that the cord or string can be knotted either close to or remote from the seal cap to facilitate pulling the cord to remove the cap. The placement of the knot usually will depend upon the size of the seal cap and whether it is adhered to a smooth fitting surface or to male threads thereon.

I accomplish these desirable results by providing a quick-removable seal cap in combination with a fitting and the like, comprising a pull cord disposed between said fitting and said cap and at least partially looped around said fitting in the area covered by said seal cap, said seal cap tightly engaging said fitting and said cord loop to prevent entry of foreign matter and to restrain said cord loop from substantial movement relative to said fitting.

I also desirably provide a similar seal cap arrangement wherein a portion of said cord loop is passed over the end edges of said fitting to aid in retaining said cord loop on said fitting.

I also desirably provide a similar seal cap arrangement wherein said loop is knotted closely but not tightly about said fitting, said knot being covered by said seal cap.

I also desirably provide a similar seal cap arrangement wherein the outer end portions of said pull cord are knotted remotely from said fitting to form a hand loop for grasping and pulling said cord.

During the foregoing discussion, various objects, features and advantages of the invention have been set forth. These and other objects, features and advantages of the invention together with structural details thereof will be elaborated upon during the forthcoming description of certain presently preferred embodiments of the invention and presently preferred methods of practicing the same.

In the accompanying drawings I have shown certain presently preferred embodiments of the invention and have illustrated certain presently preferred methods of practicing the same, wherein.

Figure 1:
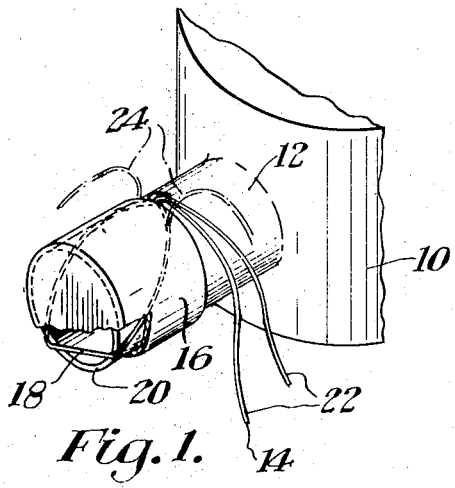
FIG. 1 is an isometric view of a seal cap and pull string mounted on a typical fitting.
Figure 1A:
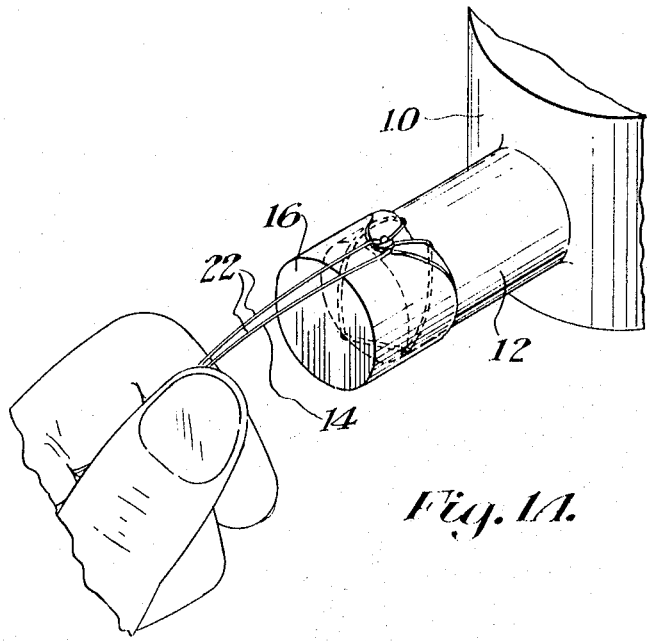
FIG. 1A is a similar view illustrating removal of the seal cap shown in FIG. 1.

Referring now to FIGS. 1 and 1A of the drawings, the quick-removal seal cap arrangement shown therein is used in connection with a plumbing component 10 which may be a valve, drier unit, or the like to which is secured a conventional fitting 12. The fitting 12 may take a variety of conventional forms and is representative for example of either the inlet or outlet port of the component 10. Thus, the fitting 12 can be an interiorly or exteriorly threaded fitting, sweat fitting or flared fitting. The fitting 12 can, of course, exist independently of any component such as component 10 and in many known varieties.

A flexible member or pull cord 14, such as a string or wire, is wrapped about the end of the fitting 12, preferably in the area covered by seal cap 16.

Where the fitting 12 is a smooth or "sweat" fitting, for soldering purposes, a bight portion 18 of the cord loop can be passed over the end edges 20 of the fitting 12 to aid in retaining the loop upon the fitting 12 when the ends of the pull cord 14 are grasped and pulled as shown in FIG. 1A. Depending upon the material from which the seal cap 16 is made, pulling the ends of the cord 14 either pops the cap 16 off the fitting 12 or slices the cap 16 longitudinally for easy removal.

Where the seal cap 16 is less resilient, the ends 22 of the cord 14 desirably exit from the seal cap 16 at points diametrically opposed, or nearly so, about the cap 16 to spread the removal forces when the cord loops 14 are pulled (FIG. 1). This alternative arrangement is denoted by chain outlines 24 of the pull cord. For more stretchable seal caps 16, the ends 22 of the cord 14 desirably are brought out of the cap in proximity to one another as denoted by the solid outlines thereof in FIG. 1. In any case, the tightly fitting seal cap 16 at least aids in retaining the loop portion 18 of the pull cord 14 when the latter is used to cut or strip the seal cap 16 from the fitting 12. For example, in the FIG. 2 arrangement described below, seal cap 30 prevents loop 32' from being displaced from its position within the seal cap 30.

Figure 2:
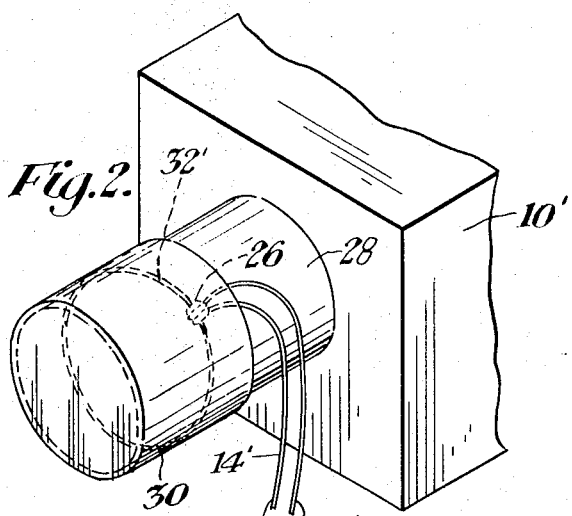
FIG. 2 is a similar isometric view showing another arrangement of the pull string.

Referring now to FIG. 2 of the drawings, cord 14' is preferably knotted at 26, or alternatively twisted at this location, to ensure that the free ends 22' of the cord are pulled simultaneously. The arrangement of FIG. 2 is useful in connection with a larger fitting 28 and seal cap 30. In the latter embodiment of my invention, the cord 14' is closely, but not tightly, looped and knotted about the area of the fitting 28 to be covered by the FIG. cap 30. As in the arrangement of FIG. 1 when the seal cap 30 is shrunk or molded or otherwise placed upon the fitting 28 the loop 32 of the cord 14' is secured in place by the seal cap, which covers the knot 26. The cord loop 32' thus is held in place until the free ends 22' of the cord can be manipulated to pull or tear the seal cap 30 from the fitting 28 in much the same manner as shown in FIG. 1A.

Figure 3:
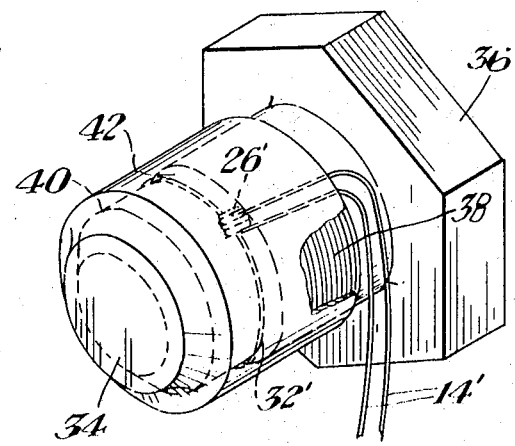
FIG. 3 is a similar view showing still another arrangement of the pull string.

A similar arrangement is shown in FIG. 3 in which the quick-removable seal cap 34 is employed in connection with a flared or compression fitting 36 having a male thread 38 is conventionally separated by a smooth cylindrical area 42.

Desirably the seal cap 34 covers both the threaded and tapered areas 38—40 of the fitting 36. The pull cord 14' can be looped as denoted by reference character 32' about the area 42 and intermediate the threaded and tapered areas 38, 40. Knot 26' can be provided for the purposes described in FIG. 2 or omitted and cord arranged generally as shown in FIGURES 1 or 4.

Figure 4:
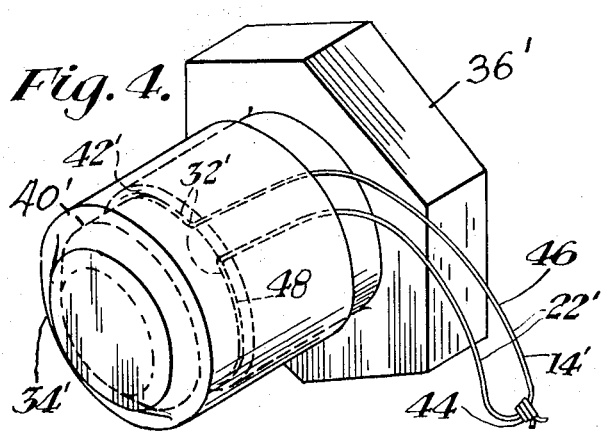
FIG. 4 is another similar view showing yet another arrangement of the pull string.

The modification of my novel seal cap and pull cord of FIG. 4 is arranged to facilitate grasping and pulling the ends 22' of the cord 14' to remove the seal cap 34'. In this arrangement the cord 14' is looped partially around the intermediate area 42' of the fitting 36', but the knot 26' alternatively is omitted. The ends of the cord 14' are knotted together as denoted by reference character 44 to provide a relatively large hand loop 46 to facilitate grasping the cord 14'. It will be understood of course that the ends of the cord 14 or 14' of any of the preceding FIGS. similarly can be knotted as shown in FIG. 4. It will also be understood that the pull cord loop 48 about the fitting 36' can be knotted after the manner of the knotted loop 32' of FIG. 3.

The operation of the removable seal caps of FIG. 2 and 3 is essentially similar to that shown and described in connection with FIG. 1A of the drawings. The FIG. 4 embodiment of my invention is likewise similar to the operation of FIG. 1A with the exception that the hand or part thereof is passed through the loop 46 formed by the cord knot 44 when stripping or slicing the seal cap 34' from the fitting 36'. In the FIG. 4 arrangement, the exit points of the pull cord loop 48 from the seal cap 34' can be separated if desired (as shown alternatively in FIG. 1) to equalize pull forces upon the seal cap 34'.

From the foregoing it will be apparent that novel and efficient forms of quick-removable seal caps for fittings and the like have been described herein. While I have shown and described certain presently preferred embodiments of the invention and have illustrated certain presently preferred methods of practicing the same, it is to be distinctly understood that the invention is not limited thereto but may be otherwise variously embodied and practiced within the scope of the following claims.

I claim:

1. A quick-removable resilient seal cap in combination with a fitting and the like, comprising a pull cord disposed between said fitting and said cap in contact with said fitting, said cord being at least partially looped around said fitting in the area covered by said seal cap, said seal cap tightly and sealingly engaging said fitting to prevent entry of foreign matter, said loop being substantially enclosed by said cap, and said loop being secured between said cap and said fitting to restrain said cord loop from substantial movement relative to said fitting prior to use of said pull cord.

2. The combination according to claim 1 wherein a portion of said cord loop is passed over the end edges of an opening of said fitting to aid in retaining said cord loop on said fitting, and said seal cap is positioned on said fitting in engagement with said end edges and said loop portion.

3. The combination according to claim 1 wherein the free ends of said cord exit from said cap at separated points about an adjacent edge of said seal cap to equalize pull upon the cap.

4. The combination according to claim 1 wherein said loop is knotted closely but not tightly about said fitting, said knot being covered by said seal cap.

5. The combination according to claim 1 wherein the outer end portions of said pull cord are knotted remotely from said fitting and cap to form a hand loop for grasping and pulling said cord.

6. The combination according to claim 1 wherein said fitting includes a tapered end and a male threaded area spaced therefrom and said loop is passed around said fitting space.

7. The combination according to claim 6 wherein said loop is knotted closely but not tightly about said fitting space, and said seal cap covers both said tapered and said threaded areas of said fitting.

8. The combination according to claim 4 wherein free ends of said loop each extend sufficient distances from said cap for grasping and pulling both cord-end portions to distribute pull forces exerted thereby on said cap.